Patented Jan. 9, 1951

2,537,146

UNITED STATES PATENT OFFICE 2,537,146

COPOLYMERS OF ACRYLONITRILE AND ISOBUTYLENE AND METHODS OF MAKING THE SAME

Marion R. Lytton, Wilmington, Del., assignor to American Viscose Corporation, Wilmington, Del., a corporation of Delaware No Drawing. Application November 16, 1943, Serial No. 510,491

1 Claim. (Cl. 260—85.5)

This invention relates to artificial resin masses. More particularly, the invention is concerned with copolymers of acrylonitrile and isobutylene.

I have discovered that copolymers of acrylonitrile and isobutylene may be prepared which possess valuable properties which render them useful for numerous industrial purposes.

The copolymers of acrylonitrile and isobutylene of my invention, are preferably prepared according to the emulsion technique, that is in aqueous medium in the presence of emulsifying agents. Preferred emulsifiers are those of the anion-active type which contain soap-like residues, such as, for example, the sulfated alcohol known commercially as "Duponol O. S."; sodium oleate, a mixture of sodium oleate and small amounts of polyvinyl alcohol; or the like.

In effecting copolymerization of isobutylene and acrylonitrile, it is preferable to employ the isobutylene in preponderant amounts, say, in the ratio of about two and a half parts or more thereof to one part of acrylonitrile. Any great variations in the proportionate relationships mentioned, such as the use of equimolecular proportions for example, has not been found advantageous since, in any case, the amount of acrylonitrile in the end product is substantially greater than the amount of isobutylene, the product generally containing about 65% or more of acrylonitrile, and 35% or less of isobutylene.

Polymerization catalysts, such as oxygen in any form, as for instance, free oxygen, or substances which release available oxygen, of the type of potassium persulfate, which is representative, may be added to the mixture of isobutylene and acrylonitrile, for the purpose of accelerating the copolymerization.

The copolymerization of isobutylene and acrylonitrile may be effected by heating the emulsion of the monomeric components. Temperatures of between 25° C. and 75° C. are preferred. The lower temperatures are, in general, more desirable, and may be utilized if the copolymerization is carried out in the presence of relatively large amounts of catalyst.

The emulsions obtained according to my invention may be coagulated by stirring the same into isopropyl alcohol preferably containing a small amount, say about 5 to 10%, of a weakly acidic material such as acetic acid. The copolymer settles out in the form of a fine white granular powder which may be separated by centrifuging or by filtration.

The products comprise preponderant amounts of internally plasticized acrylonitrile, and they are soluble in acetonitrile and nitroalkanes, such as nitromethane, nitroethane, etc. This was not to be expected, since the polymers of the individual monomers making up these copolymers are insoluble in acetonitrile and the nitroalkanes, polyacrylonitrile being insoluble in such solvents, and polyisobutyene being soluble in hydrocarbons such as xylene, benzene, etc. The copolymers of acrylonitrile and isobutylene according to my invention are insoluble in hydrocarbons. The copolymers of my invention have softening points as high as 70 to 75° C. This also was unexpected, especially since polyisobutylene has a softening point considerably below room temperature.

Coatings and films obtained by pouring or spraying acetonitrile or nitroalkane solutions of the copolymers of my invention on various substrata such as glass, wood, or metal surfaces, are characterized by being tough and resilient, impervious to chemicals, such as acids and alkalis, and resistant to weather effects. Such coatings and films are dimensionally stable, and do not shrink to any appreciable extent even when subjected to boiling water.

The following examples will further illustrate how the invention may be carried out in practice, but the invention is not to be considered as restricted thereby.

Example I

A polymerization in emulsion was carried out as follows: A charge consisting of

| | |
|---|---|
| Water | ccs__ 100 |
| Acrylonitrile | ccs__ 10.5 |
| Isobutylene | ccs__ 25 |
| Potassium per sulfate | gm__ 0.2 |
| "Duponol O. S." | ccs__ 5 | was subjected to polymerizing conditions under pressure, so as to maintain the isobutylene in liquid condition, and at a temperature of 50° C., for 120–144 hours, at which time copolymerization was complete, and the emulsion had the appearance of a thick soap-like solution. It was poured into 200 ccs. of isopropyl alcohol containing 20 ccs. of glacial acetic acid, which broke and coagulated the emulsion. After standing for about 10 hours, the copolymer precipitated out in granular form. The glacial acetic acid was washed out by filtering and taking up the copolymer in isopropyl alcohol. The alcohol was washed out with ether and after removing the ether, the copolymer was obtained in the form of a granular powder which analyzed 69.3% acrylonitrile
30.7% isobutylene and had a softening point of about 70 to 75° C.

*Example 2*

A copolymer was prepared in substantially the manner described in Example 1, and the product analyzed 63.5% acrylonitrile
36.5% isobutylene and had a softening point of 40 to 60° C.

As several modifications may be practiced without departing from the spirit and scope thereof, it is to be understood that my invention is not to be limited except as defined in the appended claim.

I claim:

A copolymer of acrylonitrile and isobutylene containing, in the copolymer molecule, about 37% of isobutylene, and about 63% of acrylonitrile.

MARION R. LYTTON.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,241,900 | Brubaker | May 13, 1941 |
| 2,376,014 | Semon | May 15, 1945 |